United States Patent
Maeland et al.

(12)

(10) Patent No.: US 6,290,753 B1
(45) Date of Patent: Sep. 18, 2001

(54) HYDROGEN STORAGE IN CARBON MATERIAL

(75) Inventors: Arnulf Julius Maeland, Royal Palm Beach, FL (US); Arne Torbjørn Skjeltorp, Hebekk (NO)

(73) Assignee: Institutt for energiteknikk (NO)

( * ) Notice: Subject to any disclaimer, the term of this patent is extended or adjusted under 35 U.S.C. 154(b) by 0 days.

(21) Appl. No.: 09/381,791

(22) PCT Filed: Feb. 5, 1999

(86) PCT No.: PCT/NO99/00040

§ 371 Date: Sep. 22, 1999

§ 102(e) Date: Sep. 22, 1999

(87) PCT Pub. No.: WO99/40023

PCT Pub. Date: Aug. 12, 1999

(30) Foreign Application Priority Data

Feb. 6, 1998 (NO) ................................. 19980530

(51) Int. Cl.⁷ ............................. C01B 31/00; C01B 3/00

(52) U.S. Cl. ............................. 95/116; 95/903; 206/0.7; 502/416; 502/526

(58) Field of Search ............................. 95/116, 900, 901, 95/903; 206/0.7; 423/648.1, 448, 445 B; 502/180, 416, 526

(56) References Cited

U.S. PATENT DOCUMENTS

| | | |
|---|---|---|
| 5,614,460 | 3/1997 | Schwarz et al. .................... 502/418 |
| 5,626,650 * | 5/1997 | Rodriguez et al. .................... 95/116 |
| 5,653,951 | 8/1997 | Rodriguez et al. .................... 423/439 |
| 6,113,673 * | 9/2000 | Loutfy et al. .................... 95/116 |
| 6,159,538 * | 12/2000 | Rodriguez et al. .................... 427/213.31 |

FOREIGN PATENT DOCUMENTS

| | | |
|---|---|---|
| WO 94/07794 | 4/1994 | (WO) . |
| WO 94/17908 | 8/1994 | (WO) . |
| WO 98/42621 | 10/1998 | (WO) . |

OTHER PUBLICATIONS

Nature, vol. 388, 1997, A. Krishnan et al., "Graphitic cones and the nucleation of curved carbon surfaces", p. 451–454, figure 2, abstract.

R. Evans; J. Phys. Condens. "Fluids adsorbed in narrow pores: phase equilibria and structure" Matter 2: 8989–9007 (1990).

S. Lynum, J. Hugdahl and R. Hildrun; "The Kvaerner CB & H process", presented at the conference Carbon Black World, Nice, Mar. 4–6th, 1996.

(List continued on next page.)

*Primary Examiner*—David A. Simmons
*Assistant Examiner*—Frank M. Lawrence
(74) *Attorney, Agent, or Firm*—Akerman Senterfitt

(57) ABSTRACT

In a method for storing hydrogen in a carbon material containing microstructures in the form of cones with cone angles being multiples of 60°, the carbon material is introduced in a reaction vessel which is evacuated while the carbon material is kept at a temperature of 295–800 K, after which pure hydrogen gas is introduced in the reaction vessel, the carbon material being exposed to a hydrogen gas pressure in the range of 300–7600 torr such that the hydrogen gas is absorbed in the carbon material, and after which the reaction vessel is left at the ambient temperature with the carbon material under a fixed hydrogen gas pressure. For use the hydrogen is released in the form of a gas from the carbon material either at ambient temperature or by heating the carbon material in the reaction vessel. In a method for refining a carbon material of this kind for hydrogen storage, the carbon material is produced in a reaction chamber with the use of a catalyst for adjusting the cone angle distribution of the microstructures. Use for storing of hydrogen as fuel for powering transport means, including vehicles.

6 Claims, 2 Drawing Sheets

OTHER PUBLICATIONS

M. Ge & K. Sattler; "Obsrevation of fullerene cones", Chemical Physics Lettes, 222: 192–196 (1994).

A. Chambers & al., "Hydrogen Storage in Graphite Nanofibers", J. Phys. Chem. B., vol. 102, 22: 4253–4256 (1998).

A. C. Dillon & al., "Storage of hydrogen in single–walled carbon nanotubes", Nature, vol. 386: 377–379 (Mar. 27, 1997).

* cited by examiner

HYDROGEN STORAGE IN CARBON MATERIAL

TECHNICAL FIELD

The present invention concerns a method for storing hydrogen in a carbon material comprising turbostratic microstructures of elemental carbon, wherein said microstructures are including cones, the cone angles of which being multiples of 60°.

Finally, the invention concerns the use of a carbon material of this kind.

BACKGROUND ART

Environmental considerations have lead to a comprehensive research with the aim of developing new technologies which may replace gasoline as the primary fuel for powering vehicles and vessels of different kinds. Pollutants produced by today's transport means include carbon monoxide and carbon dioxide, nitrogen oxides and sulphur oxides, hydrocarbons and particulates, and increasingly stricter rules and regulations in order to reduce or eliminate pollutants of this kind have for instance forced the car producers to consider the use of cleaner fuels or alternative methods for powering the vehicles. Hydrogen is the ultimate clean fuel, as the only combustion product is water. Hydrogen may with minor modifications be used in a conventional internal combustion engine. Hydrogen may also be used in a fuel cell powering vehicles and this seems in fact to be the best solution currently available. Another currently used technology is vehicles powered by electrical batteries. Both hydrogen-powered and battery-powered vehicles have zero pollutant emission.

A major obstacle which has prevented hydrogen from being the primary choice as clean fuel for use in vehicles, is the problem of storing hydrogen in the vehicles. Extensive research activity has in the past 30 years been centered on storing hydrogen in the form of solid metal hydrides. Metal hydrides are generated exothermally when metals and alloys are exposed to hydrogen. The hydrogen decomposes to atomic hydrogen in an exothermal reaction and subsequently enters interstices in the metal lattice. The hydrogen is recovered for use by heating, which in the present context may take place by means of the heat of combustion. The advantage of using metal hydrides for hydrogen storage is based on the fact that their volume density is very large. In reality the volume density of many hydrides is larger than that of solid hydrogen, for instance there are $4.3 \times 10^{22}$ H atoms/cm$^3$ in solid hydrogen at 4.2 K while there are almost twice as many in TiH$_2$, i.e. $9.2 \times 10^{22}$ H atoms/cm$^3$. The major disadvantage is among others caused by low values for the hydrogen content based on weight or unacceptable high temperatures for the hydrogen recovery. The well-known hydrogen storage systems FeTiH$_2$ and LaN$_2$ and LaNi$_5$H$_6$ contains for instance 1.9 and 1.5% by weight hydrogen and even though they have acceptable recovery temperatures, their hydrogen content is too low for use in vehicles. MgH$_2$ and TiH$_2$ have in contrast thereto higher hydrogen content, respectively 7.6 and 4.0% by weight, but must be heated to high temperatures in order to recover the hydrogen. Disproportionation, poisoning and accompanying loss of capacity and the need for regeneration of some of the storage alloys are also serious drawbacks.

Onboard storage of hydrogen in the form of gas or liquid is also a possibility. Compressed hydrogen is a relatively inexpensive alternative in onboard storage, However, weight and volume considerations make this alternative little attractive. Even if liquid hydrogen is acceptable with regard to weight and volume, it is very expensive due to the need for cooling the gas to 21 K and maintaining a low temperature in order to prevent hydrogen loss due to evaporation. Safety requirements also appear as potential drawbacks.

Hydrogen adsorption on activated carbon is another possible method for hydrogen storage. Hydrogen is in this case physisorbed at low temperatures on an active carbon material with high surface area. An advantage of this method is that only low energy is required to recover the hydrogen. However, the method requires the system all the time to be maintained at a low temperature in order to prevent a build up of the hydrogen gas pressure to dangerously high levels.

U.S. Pat. No. 5,614,460 (Schwartz & al.) discloses a method for producing microporous carbon materials which may be used as storage media for light fuel gases such as methane or hydrogen or as catalyst supports. U.S. Pat. No. 5,653,951 (Rodriguez & al.) generally concerns storage of hydrogen in layered nanostructures in form of carbon nanotubes, carbon nanofibrils, carbon nanoshells and carbon nanofibres. Hydrogen is chemisorbed in the interstices in the nanostructures. The method for storing hydrogen according to this patent specification discloses the use of nanostructures with a surface area of 50 800 m$^2$/g, a crystallinity of at least 50% and interstices in the crystalline areas with a size from 0.335 to 0.67 nanometers, the surfaces in the nanostructures defining the interstices being stated as having to posses chemisorption properties with regard to hydrogen. The method comprises introduction of hydrogen in a vessel at a pressure of at least 300 torr. However, the production of the stated materials in large volumes is difficult and reproducible absorption results have also turned out to be difficult to achieve.

DISCLOSURE OF INVENTION

The object of the present invention is to provide a method for storing hydrogen in a material which has low weight and is compact, easy in use, safe and which does not need to be subjected to a regeneration process after use.

The above object and advantages are achieved according to the invention with a method which is characterized by comprising steps for introducing said carbon material in a reaction vessel, evacuating said reaction vessel to a pressure less than $10^{-6}$ torr by keeping the carbon material at a temperature in the range of 295 K to 800 K, introducing pure hydrogen gas in the evacuated reaction vessel to expose said carbon material to said pure hydrogen gas at a pressure in the range of 300 torr to 7600 torr, allowing said pure hydrogen gas to absorbed into said microstructures of said carbon material, and leaving said reaction vessel at ambient temperature, typically 295 K or slightly below, the material contained therein being under a fixed hydrogen gas pressure within said pressure range, the hydrogen as required being released as a gas from said carbon material at said ambient temperature or by heating said carbon material in said reaction vessel, and a method which is characterized by comprising the step of adding a catalyst means to a reaction chamber wherein said carbon material is being produced, in order to adjust a cone angle distribution of microstructures of elemental carbon, thereby increasing the hydrogen storage capacity of said carbon material.

According to the invention the carbon material used in the method according to the invention is applied for hydrogen storage.

Advantageously the carbon material is heated in step b) of the method to a temperature in the range of 400 to 700 K, preferably by heating the carbon material to a temperature in the range of 400 to 600 K.

Advantageously the carbon material in step c) of the method is exposed to pure hydrogen gas at a pressure corresponding to the saturation pressure of the carbon material in order to obtain a hydrogen storage capacity of at least 5 percent by weight of the carbon material.

Advantageously the absorption of pure hydrogen gas into the microstructures of the carbon material is accomplished in step d) of the method for storage by means of a chemisorption process.

Advantageously a carbon material whose crystallinity is at least 10 percent and which has a surface area in the range of 1 $m^2/g$ to 2000 $m^2/g$ is used in the method for storing. According to the invention, the carbon material is used for storing hydrogen.

BRIEF DESCRIPTION OF DRAWINGS

The invention shall now be discussed in more detail and with reference to an example as well as the accompanying appended drawing wherein.

DETAILED DESCRIPTION OF INVENTION

Specifically the present invention concerns storage in turbostratic microstructures in the form of cones with total disinclinations or cone angles which are multiples of 60°, i.e P×60° where P is 1, 2, 3, 4, 5. In addition to cones with disinclinations of 60°, 120°, 180°, 240° and 300°, the turbostratic microstructures may also be flat discs and then, of course, P=0. It is supposed that in the method for storing according to the invention hydrogen is absorbed or adsorbed in one way or another in or on the surfaces of the cone-shaped microstructures. The absorption and adsorption of the hydrogen in or on carbon may by large take place in three different ways, viz. by enhanced physisorption or physical bonding where van der Waal forces bind hydrogen for instance to the surface of the cones or hexagonal carbon networks. On this scale the cone surfaces appear as flat. The van der Waal forces are weak and hydrogen is only bound at low temperatures. Hydrogen may also be absorbed or adsorbed in or on carbon by chemisorption or chemical bonding. Hydrogen is then bound chemically and especially along the edges of the structure. These bonds are much stronger than those which can be obtained by physisorption. A third mechanism which leads to hydrogen bonding in carbon, is the occurence of a so-called capillary condensation at the vertex of the cones, something which is caused by a combined presence of a so-called "finite size" and surface effects.

Figure 1:
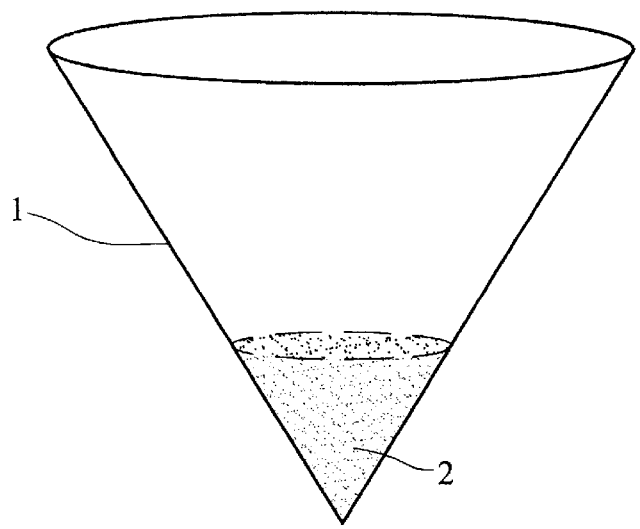
FIG. 1 schematically shows condensation of hydrogen on a cone-shaped microstructure of carbon, FIG. 2 the desorption curve of a carbon material as used in the method according to the invention, and FIG. 3 the desorption curve for hydrogen in a carbon nanostructure according to prior art.

Capillary condensation and capillary desorption have been known for a long time, cf. W. T. Thompson (Lord Kelvin), Phil. Mag. 42:448 (1871) and R. Evans, J. Phys. Condens. Matter 2:8989 (1990). The capillary condensation takes place at a pressure $P_L$ which is lower than the bulk phase coexistence pressure $p\infty$. Basically it has been supposed that hydrogen is chemisorbed on the surface on the cone shaped structures in the embodiment of the method according to the present invention, but the inventors' experimental investigations have to some degree made likely that the hydrogen uptake in the cone-shaped microstructures is caused by a capillary condensation, as this is rendered schematically in FIG. 1 which shows a cone 1 with condensed hydrogen 2 at the cone vertex. Precisely capillary condensation may provide a far greater hydrogen uptake than for instance chemisorption.

In the method for storing according to the invention an adsorption or condensation in or on the cone-shaped microstructures of carbon take place. Particularly the method for storing, as mentioned, seems substantially to be related to the adsorption of hydrogen on carbon surfaces, viz. specifically on the cone-shaped carbon materials as used in the present invention. Such turbostratic microstructures appear in carbon materials produced by pyrolysis of hydrocarbons in an arc as used in Kvaerner's so called "Carbon black & hydrogen" (CB & H.) process. These carbon materials consist of turbostratic microstructures with total disinclinations which are multiples of 60°, i.e. flat discs (P=0) and cones with total disinclinations or cone angles of 60°, 120°, 180°, 240° and 300° (P=1, 2, 3, 4, 5).

The graphitic microstructures used for storage of hydrogen according to the present invention were produced by pyrolysis of hydrocarbons in a carbon arc in a process which recently has been developed by Kværner Engineering. This process was first presented at the 5th annual US Hydrogen Meeting, National Hydrogen Association, Washington D.C., (S. Lynum, "$CO_2$-free Hydrogen from Hydrocarbons. The Kværner CB & H Process" (1994)) and has later also been published by B. Gaudernack and S. Lynum ("Hydrogen from Natural Gas without Release of $CO_2$ to the Atmosphere", Proc. 11th WHEC, 1:511 523). Correspondingly, the process is described by S. Lynum, J. Hugdahl and R. Hildrum, in "The Kværner CB & H process", presented at the conference Carbon Black World, Nice 4 Mar. 6, 1996. The flexibility of a specially designed carbon arc plasma generator (torch configuration) permits the decomposition of a range of hydrocarbons from methane to heavy oil. The plasma gas is hydrogen and the effective plasma temperature of the process exceeds 2300 K. The presence of carbon cones and the nucleation of curved carbon surfaces in carbon materials produced in this process were mentioned for first time by A. Krishnan & al. in "Graphitic cones and the nucleation of curved carbon surfaces", Nature, Vol. 388:451 454 (Jul. 31, 1997) and is also the subject of Norwegian patent application 19971413 of Mar. 25, 1997 (Hildrum & Nordvik) with the title "Microconical graphite materials" and filed by Kværner Engineering. It must, however, be remarked that corresponding turbostratic microstructures of this kind also are known in carbon materials produced by other manufacturers under different conditions. In this case it may for instance be referred to M. Ge & K. Sattler, "Observation of fullerene cones", Chemical Physics Letters, 220:192 196 (1994) which describes the generation of nanometer-size carbon cones by vapour condensation of carbon atoms on a graphite substrate. The observed cones have a length up to 24 nm and a basis diameter of 8 nm. They all had the same cone angle of about 19°, which is the smallest among five possible opening angles for perfect graphite cones. It is supposed that the cones, nanotubes and buckminister fullerene C60 may be initiated by using nucleation seeds of the fullerene type with different number of pentagons.

The carbon material as made by Kværner was used in experimental investigations in connection with the present invention and was comprised by turbostratic microstructures, i.e. graphitic discs which were disordered relative to each other in a plane or microstructures in the form of flat discs or cones with cone angles which were multiples of 60°, i.e. P×60° with P=1, 2, 3, 4, 5. Also a smaller amount of nanotubes was present. Cones and nanotubes made up by 20% of the material, the rest being mainly discs. The cones were typically 0.5–1.0 µm long, i.e. substantially larger than the cones observed by Ge & Sattler (op.cit). The size seems to be dependent of the process parameters and larger or smaller microstructures may evidently be made with a suitable process control. The microstructures as used in the method for storing have a crystallinity between 10% and 100%, preferably between 50% and 100%, and even more preferably between 75% and 100%. The surface area of the carbon material as used and as determined by adsorption of nitrogen at 77 K, lies between 1 $m^2$/g and 200 $m^2$/g, preferably between 50 $m^2$/g and 1000 $m^2$/g, and even more preferably between 200 $m^2$/g and 800 $m^2$/g. The cone angles are multiples of 60°, i.e. P×60°, where P=0, 1, 2, 3, 4, 5 and corresponds to the effective number of pentagons necessary to produce a specific total disinclination. The distribution of P values does not follow a Boltzman distribution. Materials with few discs (P=0) are preferred, but more preferred are materials with a large number of cones P=2, 3, 4 and 5, and even more preferred are materials where most of the cones have the values P=3, 4 and 5. It may be necessary to add a catalyst to the reaction chamber in order to influence the desired and preferred distribution of cones.

In the method for storing hydrogen according to the present invention the hydrogen is introduced in the microstructures by exposing these to pure hydrogen in a suitable reaction vessel. The carbon material is usually introduced in the reaction vessel which then is evacuated to a pressure of less than $10^{-6}$ torr, while the carbon material is heated to a temperature between 500 K and 800 K. Hydrogen is absorbed in the microstructures at a suitable temperature. Typical temperatures may vary from ambient at 295 K to about 700 K, preferably from 400 K to 700 K and even more preferably from 400 K to 600 K. The hydrogen pressure is from a few hundred torr to a pressure which corresponds to saturation and the latter may require several thousand torr. It is preferred that the hydrogen pressure is at least 300 torr and that the saturation pressure does not exceed 7600 torr. The hydrogen may be stored in the microstructures as used in the method for storing at room temperature or somewhat slightly below and at hydrogen pressure. This is in great contrast to the use of active carbon materials which must be cooled to extremely cool temperatures in order to adsorb and retain substantially large amounts of hydrogen by means of the above-mentioned physisorption process.

Activated carbon materials do not posses the properties which are necessary to chemisorb hydrogen, i.e. bind hydrogen strongly enough to be classified as chemical bonding. Instead hydrogen is bound to the carbon surface by weak van der Waal forces and hydrogen hence consequently also is released from the surface at low temperatures. Without the method for storing according to the invention to be regarded as restricted by the theory, most of the hydrogen seems to be bound to the microstructures as used in the method for storing with bonding strengths corresponding to those which are normally ascribed to chemisorption. Additional hydrogen is also absorbed by the microstructures by cooling to very low temperatures, but the amount of physisorbed hydrogen is very small compared to the chemisorbed portion and has little interest with regard to hydrogen storage in such microstructures. However, it is also a possibility that a relatively large amount of hydrogen is taken up in the cones by a so-called capillary condensation in the cone vertex, as mentioned above and schematically shown in FIG. 1.

It is in the method for storing according to the invention regarded as possible to store at least 5 percent by weight hydrogen in the microstructures used and experimental investigations indicate the possibility of storing at least 15 percent by weight or even 20 percent by weight or more.

EXAMPLE

Figure 2:
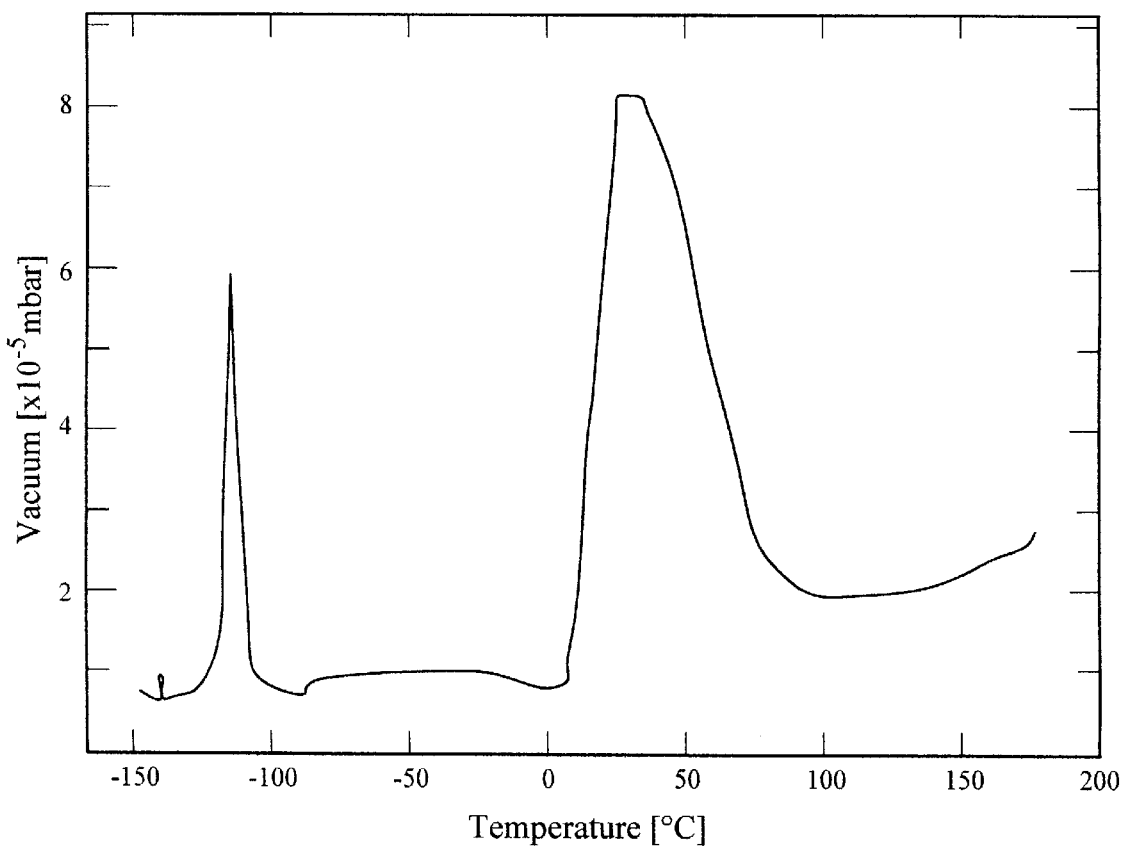

An example of the effect of the process conditions on the method for storing according to the present invention shall now be given. A sample of 0.5 g produced by the Kvaerner's CB & H process consisted substantially of cones with large cone angles and a typical length of 1 µm. This sample was placed in the reaction vessel which then was evacuated to about $10^{-6}$ torr. The sample was then pretreated by heating to 775 K in deuterium at a pressure of 760 torr. It is to be remarked that deuterium which is a heavier isotope of hydrogen may be substituted for hydrogen without substantive consequences for the method for storing according to the present invention. The heating took place for an hour and the reaction vessel was then evacuated before cooling to room temperature. An elemental analysis using scanning electron microscopy (SEM) was then performed and showed that the pretreatment effectively removed the oxygen which originally was present in the sample. The uptake of deuterium took place at room temperature (298 K) by exposing the sample to a deuterium pressure of 760 torr for a period of about 20 hrs. Desorption of deuterium from the sample was followed by a temperature programmed desorption spectroscopy (TPD spectroscopy) which consists of cooling the sample to the temperature of liquid nitrogen, evacuating the reaction vessel and initiating a programmed heating rate and determining the pressure as a function of the temperature while maintaining a dynamic vacuum. The results of the desorption spectroscopy are shown in FIG. 2. The low temperature peak of about 150 K is associated with physisorbed deuterium and must be compared with what generally is seen when activated carbon materials are used. The low intensity of this peak indicates that very little deuterium is given off at this temperature. The second high temperature peak, around 300 K, has a much higher intensity and is associated with what in the preceeding has been referred to as chemisorbed hydrogen. Hydrogen which is released from the microstructure used for storage at this temperature is the basis for the excellent hydrogen storing properties of these materials.

As mentioned it may be desired to make the carbon material used better capable of storing hydrogen in the method according to the present invention. Particularly it is desired to achieve a large proportion of cone shaped structures in the carbon material and then beyond all with opening angles with for instance P=3, 4 and 5. It may also be desired to influence the size of the cones, for instance by introducing a catalyst means in a reaction chamber where the carbon material is produced for thereby adjusting the cone angle distribution (in that connection also, see A. Krishnan & al., op.cit. p. 453), something which may contribute to increase the hydrogen storing capacity of the material. This reaction chamber which is used for the production of the carbon material, for instance with a process corresponding to Kvaerner's CB & H plasma process, must of course, not be confused with the reaction vessel used in the method for storing hydrogen according to the present invention.

Figure 3:
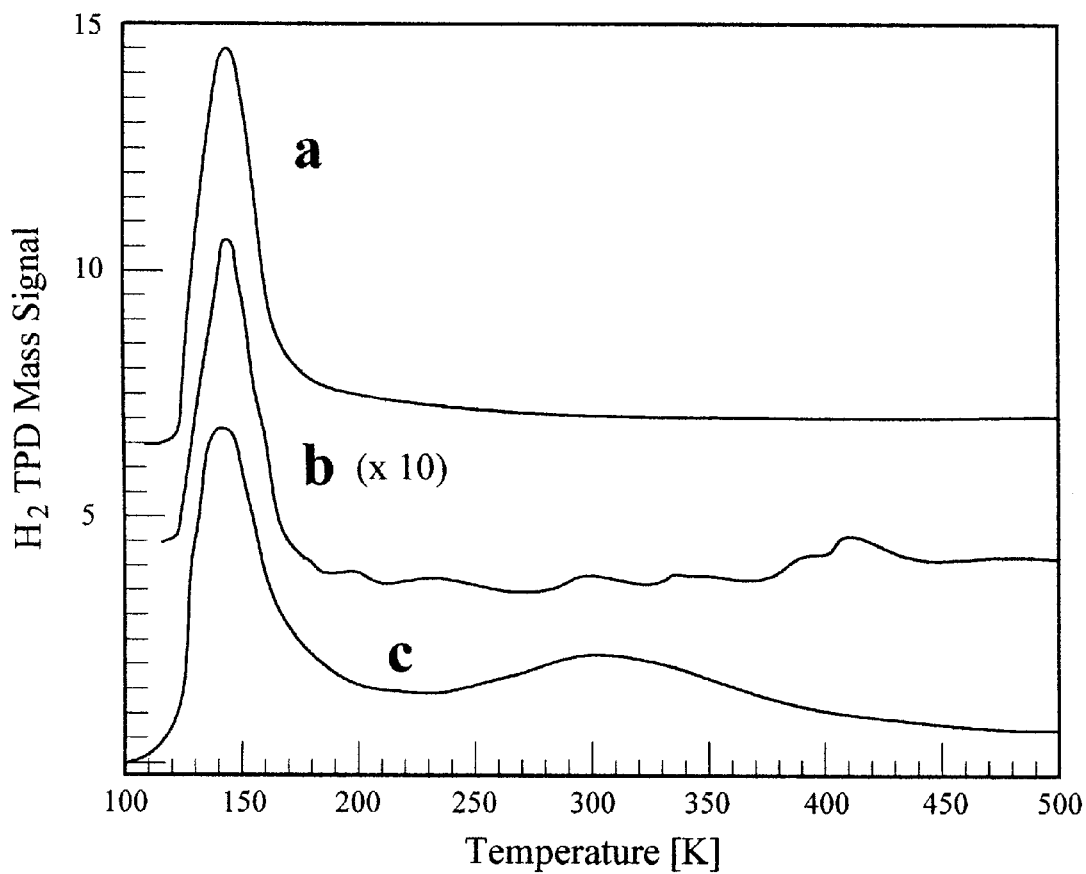

The method for storing and up take of hydrogen according to the present invention with the use of cone-shaped microstructures of carbon may be compared with tests of uptake of hydrogen in nanotubes of carbon as disclosed in the above mentioned U.S. Pat. No. 5,653,951 (Rodriguez & al.) and in A. Chambers & al., "Hydrogen Storage in Graphite Nanofibres", J. Phys. Chem. B, Vol. 102, 22:4253–4256 (1998) and in A. C. Dillon & al., "Storage of hydrogen in single-walled carbon nanotubes", Nature, Vol. 386:377 379 (1997). Particularly reference is made to the desorption curve in FIG. 3 (FIG. 1 in Dillon & al.) where it is seen that there is relatively little activity above room temperature seen in relation to the desorption at low temperatures. The opposite is the case with the method for storing according to the present invention such as evident from FIG. 2. This implies that there must be a qualitative and quantitative difference in the hydrogen uptake in the different carbon systems and that it must be the cone-shaped microstructures that are decisive. The method according to the present invention for storing hydrogen appears as more effective than which is the case with methods based on the use of other types of carbon microstructures.

Neither U.S. Pat. No. 5,653,951 (Rodriguez & al.) nor Chambers & al. provide any evidence for large hydrogen uptakes at room temperature and above. Neither has anybody managed to substantiate the claimed results of Chambers & al. of 20 l (STP) uptake of hydrogen per g in carbon structures at pressure of 120 atm. and 25° C. (tab. 1, page 4255). In the method for storing hydrogen according to the present invention the desorption curve, however, clearly shows that an uptake of this kind takes place at a temperature corresponding to the ambient, i.e. 295 K and thereabove.

What is claimed is:

1. A method for storing hydrogen in a carbon material comprising turbostratic microstructures of elemental carbon, said microstructures including cones, the cone angles of which being multiples of 60°, said method comprising steps for
 a) introducing said carbon material in a reaction vessel,
 b) evacuating said reaction vessel to a pressure less than $10^{-6}$ torr by keeping the carbon material at a temperature in the range of 295 K to 800 K,
 c) introducing pure hydrogen gas in the evacuated reaction vessel to expose the carbon material to said pure hydrogen gas at a pressure in the range of 300 torr to 7600 torr,
 d) allowing said pure hydrogen gas to be absorbed into said microstructures of said carbon material, and
 e) leaving said reaction vessel at ambient temperature, typically 295 K or slightly below, the material contained therein being under a fixed hydrogen gas pressure within said pressure range, the hydrogen as required being released as a gas from said carbon material at said ambient temperature or by heating said carbon material in said reaction vessel.

2. A method for storing hydrogen in a carbon material according to claim 1, characterized by heating in step b) said carbon material to a temperature in the range of 400 K to 700 K.

3. A method for storing hydrogen in a carbon material according to claim 2, characterized by heating said carbon material to a temperature in the range of 400–600 K.

4. A method for storing hydrogen in a carbon material according to claim 2, characterized by exposing in step c) said carbon material to said pure hydrogen gas at a pressure corresponding to the saturation pressure of said carbon material to obtain a hydrogen storage capacity of at least 5 percent by weight of said carbon material.

5. A method for storing hydrogen in a carbon material according to claim 1, characterized by accomplishing in step d) said absorption of pure hydrogen gas into the microstructure of said carbon material by means of a chemisorption process.

6. A method for storing hydrogen in a carbon material according to claim 1, characterized by using a carbon material the crystallinity of which being at least 10% and having a surface area in the range of 1 $m^2$/g to 2000 $m^2$/g.

* * * * *